(12) United States Patent
Wieduwilt et al.

(10) Patent No.: US 10,723,096 B2
(45) Date of Patent: Jul. 28, 2020

(54) METHOD FOR PRODUCING PACKAGING, AND PACKAGING MACHINE

(71) Applicant: Robert Bosch GmbH, Stuttgart (DE)

(72) Inventors: Ulrich Wieduwilt, Schwaebisch Gmuend (DE); Bernhard Vaihinger, Weinstadt (DE); Roland Czuday, Neftenbach (CH); Andreas Baechle, Rickenbach (DE)

(73) Assignee: Robert Bosch GmbH, Stuttgart (DE)

( * ) Notice: Subject to any disclaimer, the term of this patent is extended or adjusted under 35 U.S.C. 154(b) by 582 days.

(21) Appl. No.: 15/103,376

(22) PCT Filed: Dec. 2, 2014

(86) PCT No.: PCT/EP2014/076276
§ 371 (c)(1),
(2) Date: Jun. 10, 2016

(87) PCT Pub. No.: WO2015/086381
PCT Pub. Date: Jun. 18, 2015

(65) Prior Publication Data
US 2016/0311189 A1  Oct. 27, 2016

(30) Foreign Application Priority Data

Dec. 12, 2013  (DE) .................. 10 2013 225 737

(51) Int. Cl.
*B31F 5/00* (2006.01)
*B65B 51/22* (2006.01)
(Continued)

(52) U.S. Cl.
CPC .............. *B31F 5/008* (2013.01); *B23K 20/10* (2013.01); *B31B 50/02* (2017.08); *B31B 50/46* (2017.08);
(Continued)

(58) Field of Classification Search
CPC ....... B31B 50/59; B31B 50/64; B31B 50/642; B31B 50/84; B31B 70/004; B31B 70/66; B31B 70/64
(Continued)

(56) References Cited

U.S. PATENT DOCUMENTS

| 272,327 A | * | 2/1883 | Rogers | ..................... B65D 5/26 229/194 |
| 637,838 A | * | 11/1899 | Vernon | ..................... B65D 5/26 229/194 |

(Continued)

FOREIGN PATENT DOCUMENTS

| CN | 1278761 A | 1/2001 |
| DE | 1156303 | 10/1963 |

(Continued)

OTHER PUBLICATIONS

International Search Report for Application No. PCT/EP2014/076276 dated Feb. 20, 2015 (English Translation, 3 pages).

*Primary Examiner* — Hemant Desai
*Assistant Examiner* — Christopher Robin Kim
(74) *Attorney, Agent, or Firm* — Michael Best & Friedrich LLP

(57) ABSTRACT

The invention relates to a method for producing packaging (18) from paper material (5), in particular paper, cardboard or paperboard, said method comprising the following steps: forming packaging (18) from a blank (19) made of paper material (5), which paper material overlaps at at least one joining site (21); positioning the at least one joining site (21) between a sonotrode (2) and an anvil (3); applying the joining site (21) with a joining force in a joining force direction (6); and making the sonotrode (2) ultrasonically vibrate in order to ultrasonically weld the paper material (5) at the joining site (21), which method is characterised in that the paper material (5) is moistened, preferably on the inner
(Continued)

sides of the joining sites (21), before forming the packaging (18) and/or while forming the packaging (18) and/or after forming the packaging (18) and/or during the ultrasonic welding.

11 Claims, 7 Drawing Sheets

(51) Int. Cl.
| | | |
|---|---|---|
| *B23K 20/10* | (2006.01) | |
| *B65B 5/02* | (2006.01) | |
| *B31B 50/46* | (2017.01) | |
| *B31B 50/66* | (2017.01) | |
| *B31B 50/02* | (2017.01) | |
| *B31B 50/04* | (2017.01) | |
| *B31B 50/60* | (2017.01) | |
| *B31B 50/59* | (2017.01) | |
| *B31B 50/26* | (2017.01) | |
| *B31B 100/00* | (2017.01) | |
| *B23K 103/00* | (2006.01) | |
| *B31B 50/74* | (2017.01) | |
| *B31B 120/10* | (2017.01) | |
| *B31B 110/35* | (2017.01) | |

(52) U.S. Cl.
CPC .............. *B31B 50/66* (2017.08); *B65B 5/024* (2013.01); *B65B 51/222* (2013.01); *B65B 51/225* (2013.01); *B23K 2103/40* (2018.08); *B31B 50/04* (2017.08); *B31B 50/26* (2017.08); *B31B 50/592* (2018.05); *B31B 50/60* (2017.08); *B31B 50/741* (2017.08); *B31B 2100/00* (2017.08); *B31B 2100/0024* (2017.08); *B31B 2110/35* (2017.08); *B31B 2120/102* (2017.08)

(58) Field of Classification Search
USPC ....... 493/122, 132, 135, 141, 142, 150, 156, 493/203, 205, 214
See application file for complete search history.

(56) References Cited

U.S. PATENT DOCUMENTS

| | | | | |
|---|---|---|---|---|
| 3,222,235 | A * | 12/1965 | Buchner | ............... B29C 65/081 |
| | | | | 156/73.2 |
| 3,533,207 | A * | 10/1970 | Jones | .................... B65B 11/54 |
| | | | | 53/462 |
| 3,652,354 | A | 3/1972 | Su | |
| 4,208,001 | A | 6/1980 | Martner | |
| 4,241,560 | A * | 12/1980 | Deimel | ............... B29C 66/1122 |
| | | | | 53/374.9 |
| 5,250,018 | A * | 10/1993 | Chung | ................... B65D 5/548 |
| | | | | 493/134 |
| 5,605,710 | A * | 2/1997 | Pridonoff | ................ A47J 31/02 |
| | | | | 206/0.5 |
| 5,697,545 | A * | 12/1997 | Jennings | ............... B23K 20/10 |
| | | | | 228/112.1 |
| 6,066,081 | A * | 5/2000 | Bachner | ............... B65B 61/186 |
| | | | | 493/102 |
| 7,220,331 | B2 * | 5/2007 | Gmeiner | ............... B29C 65/086 |
| | | | | 156/210 |
| 8,052,816 | B2 * | 11/2011 | Klinstein | ............... B29C 65/08 |
| | | | | 156/64 |
| 8,499,956 | B2 * | 8/2013 | Westrate | .............. B65D 5/3621 |
| | | | | 220/6 |
| 2007/0175771 | A1 * | 8/2007 | Hooser | ................ B65D 85/816 |
| | | | | 206/0.5 |
| 2010/0001055 | A1 * | 1/2010 | Watterson | ................ B65D 5/10 |
| | | | | 229/117.27 |
| 2011/0132779 | A1 * | 6/2011 | Loughman | ............... B65D 5/38 |
| | | | | 206/1.5 |
| 2013/0112332 | A1 * | 5/2013 | Spicer | .................... B23K 20/10 |
| | | | | 156/64 |
| 2015/0165718 | A1 * | 6/2015 | Wieduwilt | .............. B31F 5/008 |
| | | | | 156/73.1 |
| 2018/0155084 | A1 * | 6/2018 | Abuaita | .................. B31B 70/52 |

FOREIGN PATENT DOCUMENTS

| | | | |
|---|---|---|---|
| DE | 2812138 | 6/1983 | |
| DE | 3447771 | 7/1986 | |
| DE | 10252948 | 5/2003 | |
| EP | 0014946 | 9/1980 | |
| EP | 0095628 | 12/1983 | |
| EP | 0340334 | 11/1989 | |
| EP | 390733 | 10/1990 | |
| EP | 1714875 | 10/2006 | |
| EP | 1714875 A2 * | 10/2006 | ......... B29C 65/7441 |
| GB | 2022507 B | 2/1983 | |
| WO | 9925547 | 5/1999 | |
| WO | WO-9925547 A1 * | 5/1999 | ............. B31F 5/008 |

* cited by examiner

METHOD FOR PRODUCING PACKAGING, AND PACKAGING MACHINE

BACKGROUND OF THE INVENTION

The present invention relates to a method for producing packaging and a corresponding packaging machine. In the method and in the packaging machine, paper material, in particular paper, cardboard or paperboard, is joined by means of an ultrasonic joining process.

In the European patent EP 0 340 334 A2, a device is described which is suited to joining two-ply or multi-ply paper products by means of ultrasound. The paper used in the process is provided with a thermoplastic coating. Longitudinal waves are produced by the sonotrode so that said sonotrode moves towards the anvil and away from the anvil while being ultrasonically vibrated. A sufficient compression of the paper layers is produced here by means of the corresponding ultrasonic frequency and the corresponding contact pressure. At the same time, heat builds up highly in the micro-region of the thermoplastic coating and the paper layers are thus adhesively bound.

In a schematically simplified view, the attached FIG. 10 shows an ultrasonic joining device 100 according to the prior art for joining thermoplastically coated paper material. The device 100 comprises a sonotrode 102 according to the prior art and an anvil 103 according to the prior art. The paper material 5 to be joined is located between the sonotrode 102 and the anvil 103, wherein thermoplastic layers 108 are arranged toward one another. A joining force 106 is applied to the paper material 5 in the gap between sonotrode 102 and anvil 103. The sonotrode 102 executes an ultrasonic vibration in a direction of vibration. In the device 100 according to the prior art, the direction of vibration 107 and the joining force direction 106 are oriented parallel to one another. The longitudinal direction of movement of the sonotrode 102 is thus used here for the joining process.

SUMMARY OF THE INVENTION

In the case of the method according to the invention and the device according to the invention, ultrasonic welding takes place with the joining sites being moistened. This facilitates a firm and clean joining of the paper material without adhesives or thermoplastic coatings. These advantages are achieved by means of a method for producing packaging from paper material. The paper material particularly consists of paper, cardboard or paperboard. Corrugated board can particularly be used here. The method comprises the following steps: (i) forming packaging from a blank made of paper material, which paper material overlaps at at least one joining site (21); positioning the at least one joining site between a sonotrode and an anvil; applying a joining force to the joining site in a defined joining force direction; and making the sonotrode ultrasonically vibrate in order to ultrasonically weld the paper material at the joining site. Provision is made according to the invention for the paper material to be moistened preferably on the inner sides of the joining sites before forming the packaging and/or while forming the packaging and/or after forming the packaging and/or during the ultrasonic welding. The paper material is moistened with liquid water and/or water vapor and/or a humectant or something similar. In a particularly preferred manner, pure water without additives is used. It is assumed that the paper structure is lightly damaged at the joining sites as a result of the ultrasonic welding and thus forms a local paper pulp. Due to the effect of the ultrasound and the pressure by the joining force, this paper pulp makes it possible for the paper fibers to felt and consequently to form a type of adhesive bond analogous to the process used in paper production. A type of compression of the joining surfaces leads to the formation of hydrogen bridges. This is also often described as felting. The local formation of hydrogen bridges can be actively supported by the moistening process. Particularly in the packaging industry, numerous types of adhesive bonds of cardboard packagings with the aid of dispersion adhesives (cold glue) and melt adhesives (hot glue) are used. In order to make the packaging process more efficient, to design said process in a cleaner and more hygienic manner, the ultrasonic welding method according to the present invention, which comprises moistened joining sites, can be used. The method according to the invention is particularly suited for use in the serial production of high quantities due to the short cycles in the range of 0.1 to 1 second and hold times of 0.1 to 2 seconds. The method according to the invention has the following advantages with respect to the adhesive bonding method: According to the method, no joining material is required; thus enabling hot or respectively cold glue to be substituted. The paper material does not require any additional thermoplastic coating for the joining process using ultrasonic welding. Conventional adhesive bonding machines tend to easily get dirty. Because, in a preferred manner, no additives are used in the method according to the invention with the exception of water for moistening the paper material, a reduction in the contamination and therefore a compliance to the hygienic standards, which are of great importance for the food and pharmaceutical industries, can be achieved. This also has the effect that there is no danger of a migration of joining material (glue) into the packaged goods when using the method according to the invention. In addition, energy is saved to a great degree because a continuous heating of the hot glue is not required. The energy necessary for the method is required only in the range of the joining time, that is to say in the millisecond range.

The ultrasonic vibration generated by the sonotrode has a certain direction of vibration. At the same time that the ultrasonic vibration is generated by means of the sonotrode, a joining force is applied to the paper material in the gap between the sonotrode and the oppositely positioned anvil. This joining force is directed in a joining force direction. In a preferred manner, provision is made in a first variant for the direction of vibration and the joining force direction not to be oriented parallel to one another. In the prior art, the direction of vibration is always configured parallel to the joining force direction. As a result, primarily the longitudinal direction of movement of the vibrating particles is used in the prior art for generating energy in the joining seam. In the process, the heat energy is generated from inner molecular friction and interfacial friction of the joining partners. The heat energy from the interfacial friction is thereby obtained from the deformation energy of the deformation of the joining material via the anvil geometry. In contrast, it is recognized within the scope of the invention that a far better joining of paper material is possible if a friction welding method is used, in which the interfacial friction is primarily used. The preferably used ultrasonic friction welding has various advantages with respect to the ultrasonic longitudinal welding, in which the joining force direction is oriented parallel to the direction of vibration of the sonotrode. In the case of ultrasonic friction welding, materials having less sound attenuation can be used, which is particularly the case with paper material. As a result of the frictional movement of the paper materials being joined, there are not any sound emissions as can be recognized by the hammering movements of the sonotrode in the longitudinal ultrasonic welding method. The shear and peel strength of the joint is significantly higher for ultrasonic friction welding than for joints which have been produced using typical ultrasonic joining methods. A further decisive advantage for ultrasonic friction welding is that the entire vibration, and not only the amplitude, which acts in the direction of the joining site is used for the energy input into the paper material. As a result of eliminating a hammering movement onto the paper material to be joined, said paper material is protected when carrying out the ultrasonic friction welding process.

Provision is particularly made for the joining force direction to be perpendicular or respectively at a right angle to the direction of vibration during ultrasonic friction welding. Deviations of ±10° are still considered here to be perpendicular. This orientation ensures that the amplitudes of the vibrating sonotrode act in both directions to the greatest possible extent on the paper material. At the same time, the perpendicular orientation of the joining force direction to the direction of vibration provides for an almost exclusive utilization of the interfacial friction at the joining sites.

As a result of the moistening of the paper material, a good result can, however, also be achieved using ultrasonic longitudinal welding. In a second variant, provision is therefore made in a preferable manner for the joining force direction to be parallel to the direction of vibration.

The ultrasonic vibration frequency of the sonotrode lies preferably between 30 and 35 kHz. In addition, provision is preferably made for the ultrasonic vibration amplitude of the sonotrode to be preferably between 10 and 50 µm, especially in particular between 20 and 40 µm. An interfacial friction at the joint sites which is favorable for the joining of the paper material occurs using these parameters for the ultrasonic vibration.

The inventive use of ultrasonic welding of moistened paper material leads to very stable joining sites; thus enabling the use of adhesives or thermoplastic coatings to be eliminated. In addition, it is also not necessary for printing dye to be present at the joining sites, which would promote a bonding of the paper materials similarly to a thermoplastic coating.

In a preferred manner, a common anvil and/or a common sonotrode are used for a plurality of joining sites that are spaced apart from one another. In so doing, it is possible to simultaneously join a plurality of joining sites using only one anvil and/or only one sonotrode. Parallel joining sites are particularly processed at the same time by one anvil and/or one sonotrode.

The invention further comprises a packaging apparatus for producing a packaging from paper material. The packaging apparatus comprises a forming unit. This is preferably designed as a deep drawing unit. The forming unit is used to form the packaging from a blank made of paper material. The paper material is formed in such a way that said paper material overlaps at at least one joining site. At least one sonotrode that can be set into ultrasonic vibration is furthermore provided for the ultrasonic welding of the paper material. In addition, at least one anvil is provided as a counter tool for the sonotrode. The joining force is generated by applying a corresponding force to the sonotrode and/or the anvil. The joining force thereby acts in a joining force direction. Provision is made according to invention for the paper material to be moistened by a moistening device, preferably on the inner sides of the joining sites, before forming the packaging and/or while forming the packaging and/or after forming the packaging and/or during the ultrasonic welding. The paper material is preferably moistened with liquid water and/or water vapor and/or a humectant or something similar. In an especially preferred manner, pure water is used without additives.

The advantageous embodiments presented within the scope of the method according to the invention can correspondingly be advantageously applied to the packaging apparatus according to the invention.

Provision is particularly made for the forming unit to comprise a movable die plate for forming the packaging. At least one anvil or at least one sonotrode is disposed on this die plate. In a particularly preferred embodiment, provision is made for at least one anvil to be provided on the die plate. The at least one sonotrode is then located outside of the forming unit. Hence, the at least one anvil is moved up and down together with the die plate. When joining the joining sites, the anvil is situated within the formed packaging. The sonotrode is applied externally to the packaging.

In a preferred manner, provision is furthermore made for a supply unit. The supply unit is used to supply the blank to the forming unit. As described earlier, the joining sites are preferably moistened. In a particularly preferred manner, this moistening process takes place in the supply unit. The supply unit therefore comprises the device for moistening the joining sites during the feeding process.

The packaging apparatus furthermore preferably comprises a folding tool. Portions of the blank can be folded with this folding tool, so that, for example, lugs of the blank overlap. These overlapping lugs then form the joining sites. The sonotrode is preferably integrated into the folding tool.

BRIEF DESCRIPTION OF THE DRAWINGS

An exemplary embodiment of the invention is described below in detail with reference to the accompanying drawings. In the drawings.

DETAILED DESCRIPTION

Figure 1:
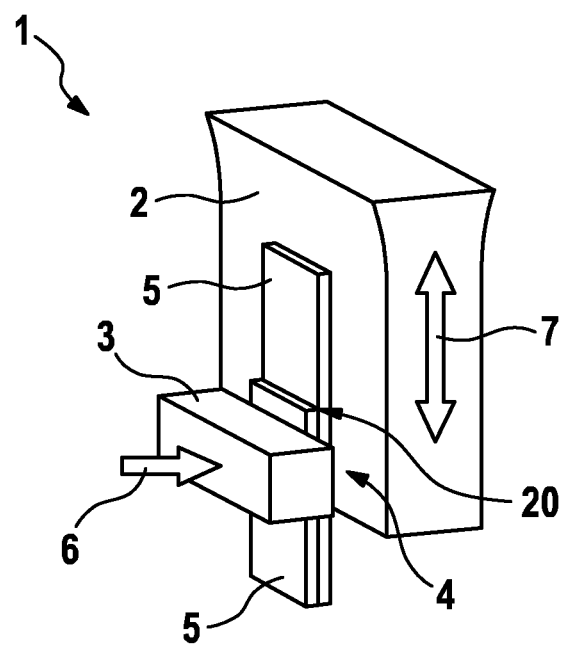
FIG. 1 shows a schematically simplified detailed drawing of a packaging apparatus according to the invention for carrying out the method according to the invention pursuant to one exemplary embodiment.

FIG. 1 shows a detail of a packaging apparatus 1 according to the exemplary embodiment in a highly schematically simplified view. The method according to the invention can be carried out with this packaging apparatus 1.

Figure 6:
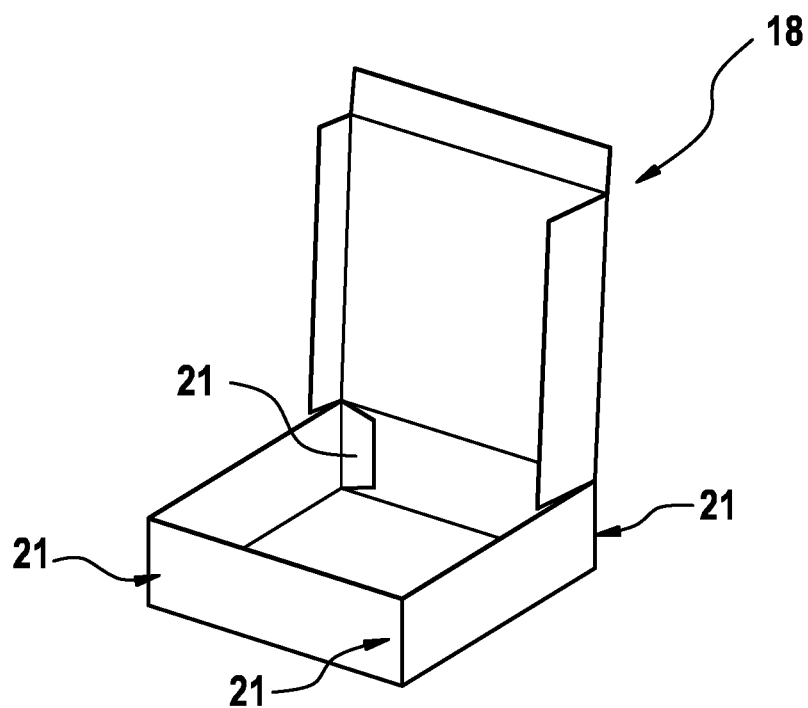
FIG. 6 shows a finished packaging as said packaging can be produced with the packaging apparatus according to the invention pursuant to the exemplary embodiment.

The packaging apparatus 1 comprises a sonotrode 2 and an anvil 3. A gap 4 is formed between the sonotrode 2 and the anvil 3. The paper material 5 to be joined is situated in this gap 4. Two lugs 20 of a packaging 18 (see FIGS. 6 and 7) which overlap within the gap 4 are shown. These two lugs 20 are connected to one another by means of the packaging apparatus 1.

A joining force acts on the paper material 5 in the gap 4 via the anvil 3. This joining force is directed in a joining force direction 6.

The sonotrode 2 is excited to carry out an ultrasonic vibration in the direction of vibration 7. This direction of vibration 7 corresponds to the direction of extension of the amplitudes of the ultrasonic vibration.

As can be easily recognized in FIG. 1, The joining force direction 6 is perpendicular to (also: at a right angle to) the direction of vibration 7. Thus, the process here relates to an ultrasonic friction welding method. As previously described, an ultrasonic longitudinal welding method can also be carried out. The joining force direction 6 and the direction of vibration 7 are then parallel to one another.

Figure 2:
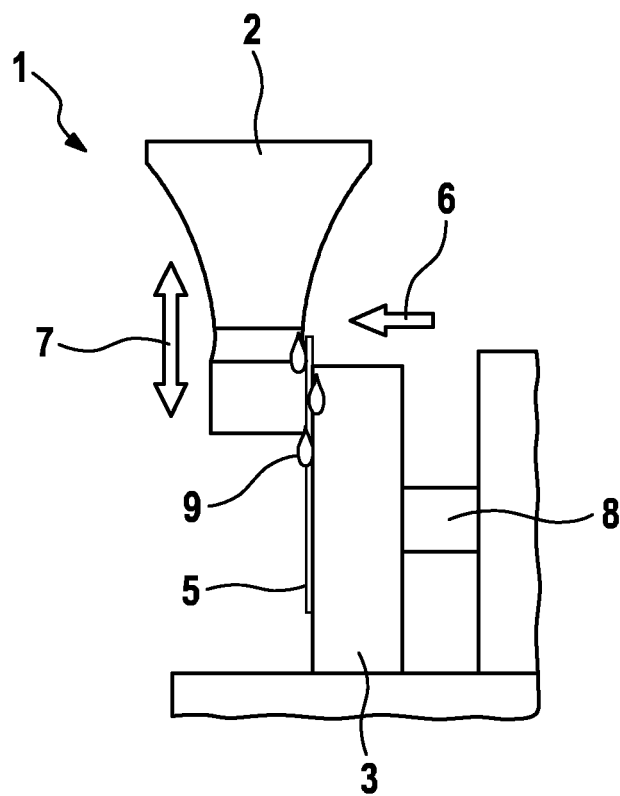
FIG. 2 shows a detailed view with regard to FIG. 1.

FIG. 2 shows a detailed view with regard to FIG. 1, likewise schematically simplified. According to FIG. 2, force is applied to the anvil 3 via a cylinder rod 8; thus enabling the anvil 3 to exert the joining force onto the paper material 5 in the gap 4. Accordingly, the cylinder rod 8 is also disposed parallel to the joining force direction 6.

In addition, FIG. 2 shows in a schematically highly simplified manner the option of moistening the paper material 5 with water 9. As previously described, this moistening promotes the joining process.

Figure 3:
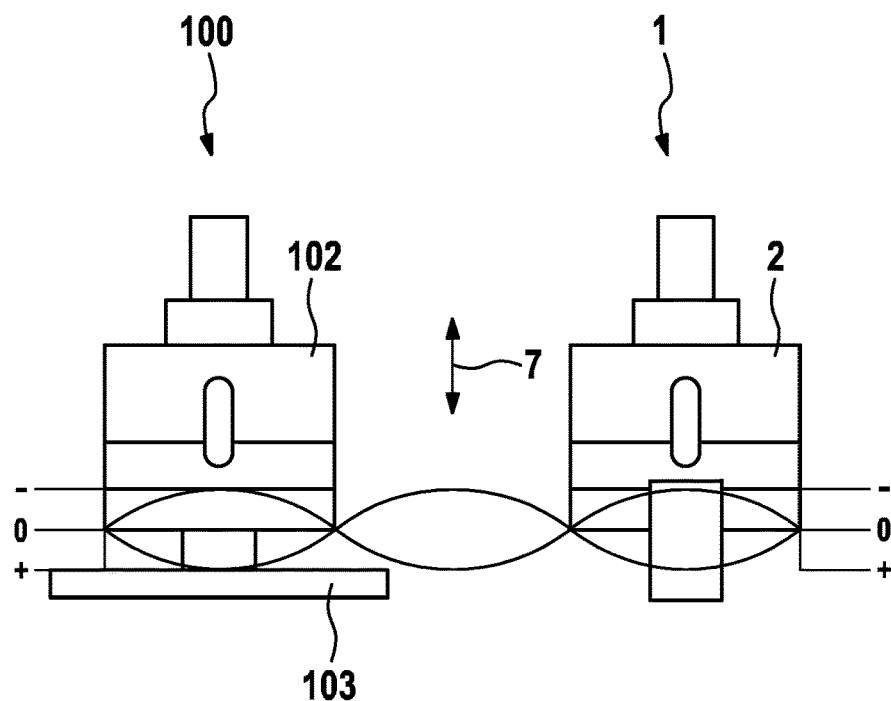
FIG. 3 juxtaposes ultrasonic longitudinal welding with ultrasonic friction welding.

FIG. 3 shows the principle of ultrasonic longitudinal welding on the left side. The amplitude of the ultrasonic vibration is not depicted true to scale in order to clarify the functional principle. The amplitude is, for example, between 20 and 40 μm. In FIG. 3, the principle of ultrasonic friction welding is depicted on the right side. It can be seen in this depiction that only the lower positive amplitude can have an effect in the direction of the paper material 5 during ultrasonic longitudinal welding. On the other hand, as shown in FIGS. 1 and 2, a lateral contact pressure on the paper material 5 towards the sonotrode results during ultrasonic friction welding. As a result, both amplitude directions, i.e. the expansion in the positive amplitude direction and the contraction or pulling back in the negative amplitude direction, can be effectively used for the joining process. By moistening the joining sites, a good result can be achieved using ultrasonic friction welding as well as ultrasonic longitudinal welding.

Figure 4:
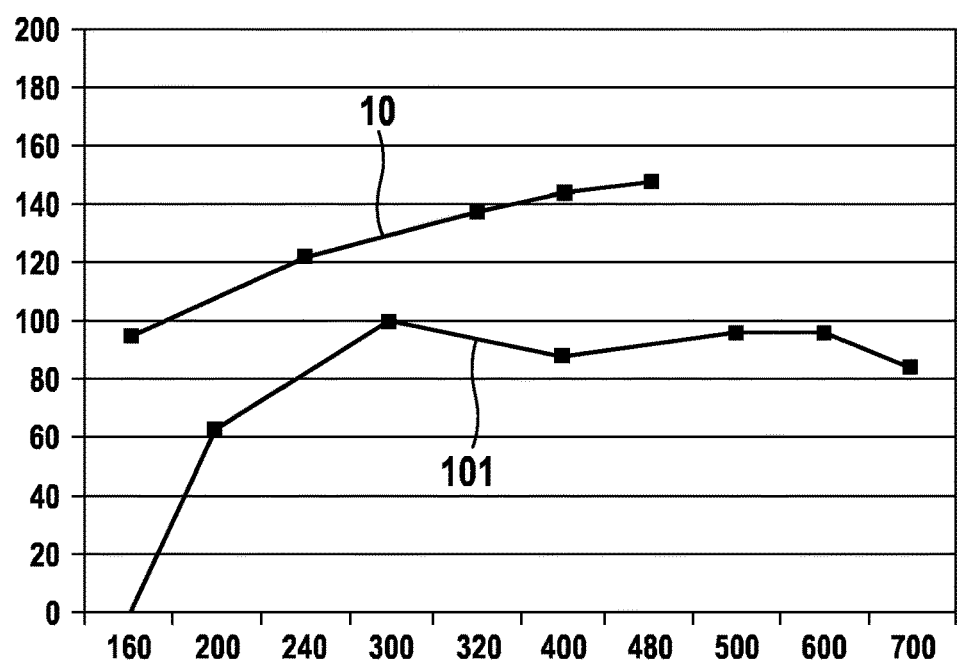
FIG. 4 shows a diagram regarding the tensile strength of the joining site produced.

FIG. 4 shows the test results in a diagram by means of which cardboard having a surface density 300 g/m² was tested with an apparatus 100 according to the prior art and with a packaging apparatus 1 according to the invention. The applied joining force in [N] is plotted on the horizontal axis. The vertical axis shows the tensile strength in [N/15] of the joining site that was created. An upper curve 10 shows the result of the inventive method comprising moistened joining sites and ultrasonic friction welding. A lower curve 101 shows the result when using the apparatus 100 according to the prior art.

Within the scope of the invention, it has been shown in experimental trials that paper, cardboard and paperboard can be better connected to one another if ultrasonic friction welding is used as the joining method. In contrast to ultrasonic longitudinal welding, the direction of vibration 7 is not parallel to the joining force direction 6 but preferably perpendicular (also: at a right angle) thereto. In comparison to the longitudinal ultrasonic welding method, the strength values of the joint are significantly increased with respect to the shear and peel strength. In addition, as shown in FIG. 4, relatively high tensile strengths are to be achieved in the range of low joining forces.

It is assumed on the basis of tests that have been performed that not only micro-splicing of the fibers and new hydrogen bridges are crucial for the joint. The results speak for a plasticizing and solidifying of fiber-containing polymers, natural or synthetic bonding agents as well as polymer-like additives. It can be assumed that plasticized regions are situated on the contacting surfaces during the joining process. The longitudinal ultrasonic joining process stresses the joining partners with an increased penetration. In order to improve the joint quality, it is more expedient to allow the mechanical stress to act parallel to the joining plane, as this has been shown within the scope of the present invention. A further significant advantage which speaks for pressing the sonotrode 2 laterally towards the paper material 5 is the complete utilization of the sonotrode vibrations in both amplitude directions. During ultrasonic friction welding, the expansion as well as the contraction movement from the standing wave generated in the vibration structure is used. If the sonotrode is pressed against the joining partner during longitudinal ultrasonic welding, only the expansion has an effect on the welding process. During contraction, the sonotrode loses contact with the paper material. A doubling of the effective amplitude can thus be achieved during ultrasonic friction welding, from, for example, 24 μm to 48 μm at 30 kHz.

Figure 5:
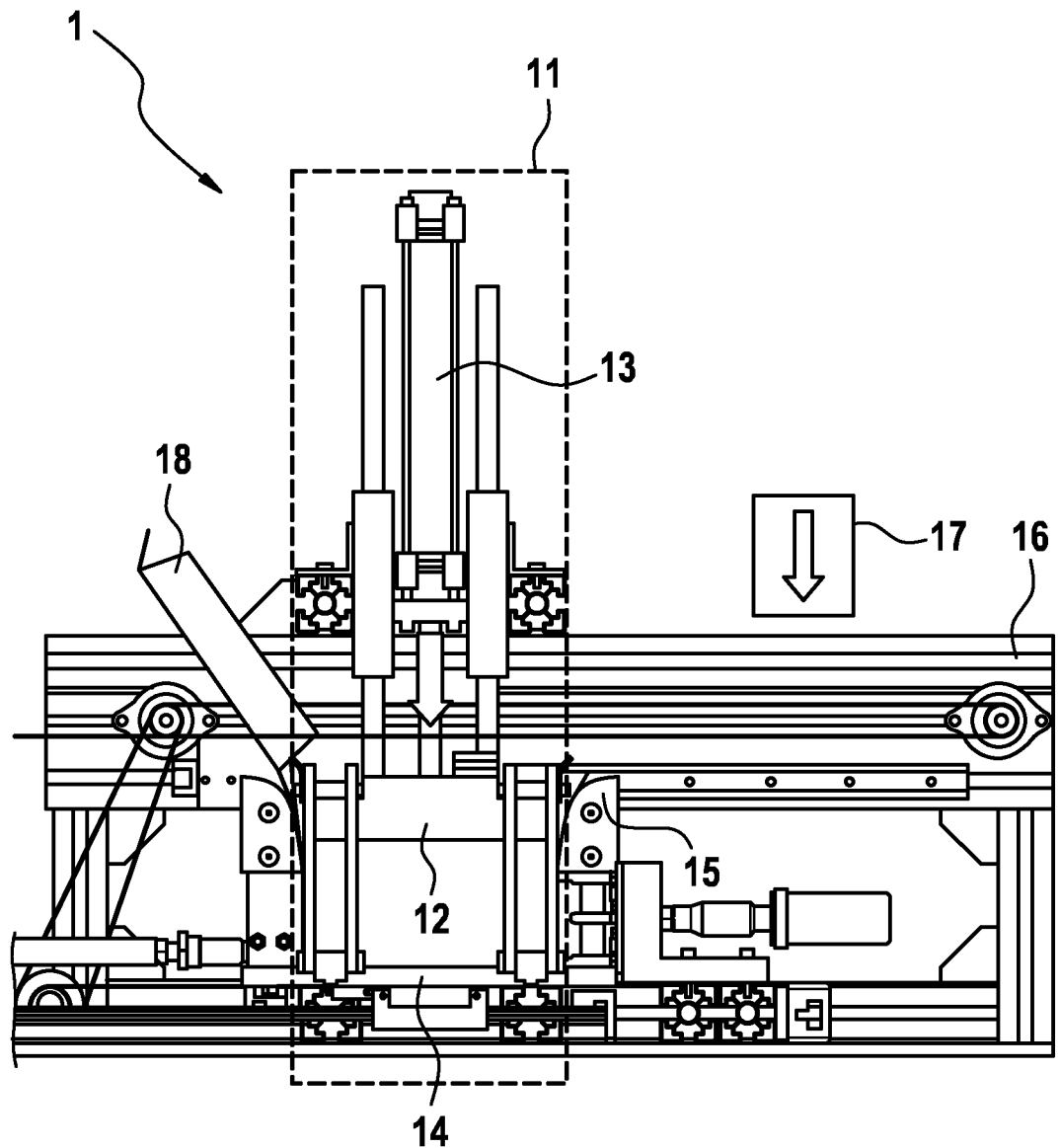
FIG. 5 shows the packaging apparatus according to the invention for carrying out the method according to the invention pursuant to the exemplary embodiment.

FIG. 5 shows the exact configuration of the packaging apparatus 1 pursuant to the exemplary embodiment. According to this depiction, the packaging apparatus 1 comprises a forming unit 11, designed as a drawing unit. This forming unit 11 comprises a die plate 12. The die plate 12 can be moved by means of a cylinder 13 in the vertical direction. The cylinder 13 is, for example, designed as a pneumatic or hydraulic cylinder. A guiding carriage of the packaging apparatus 1 is located below the die plate 12. A folding tool can be positioned with this guiding carriage 14.

In addition, the packaging apparatus 1 comprises a supply unit 16. A blank 19 (see FIG. 7) is fed into the forming unit 11 via this supply unit 16.

The supply unit 16 comprises a moistening device 17. The joining sites 21 (see FIG. 6) are moistened by means of this moistening device 17.

FIG. 5 furthermore shows the finished packaging 18, designed as a box. This packaging 18 is shown in detail in FIG. 6. According to FIG. 6, the packaging 18 has joining sites 21 on the edges thereof. These joining sites 21 are joined by means of the sonotrode 2 and the anvil 3.

Figure 7:
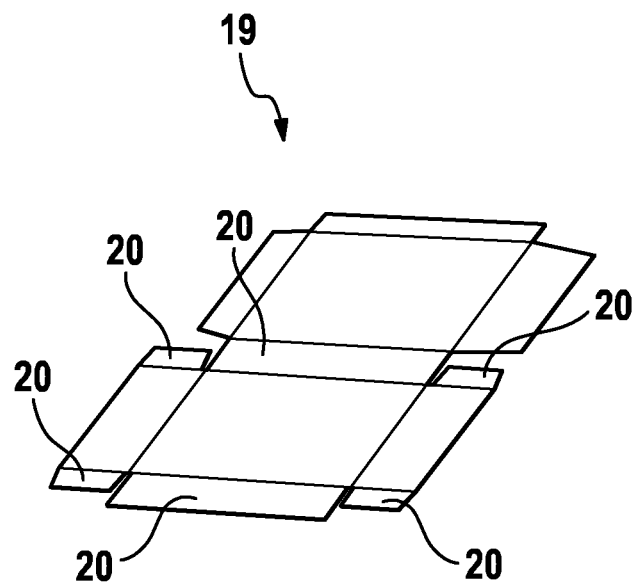
FIG. 7 shows a blank which is folded to form a packaging in the packaging apparatus according to the invention.

FIG. 7 shows the blank 19 from which the packaging 18 is formed in the forming unit 11. The blank 19 consists of paper material, for example corrugated paper. A plurality of lugs 20 is provided on the blank 19. These lugs 20 are made to overlap by means of the forming unit 11 and the folding tool 15 so that the joining sites 21 are created.

Figure 8:
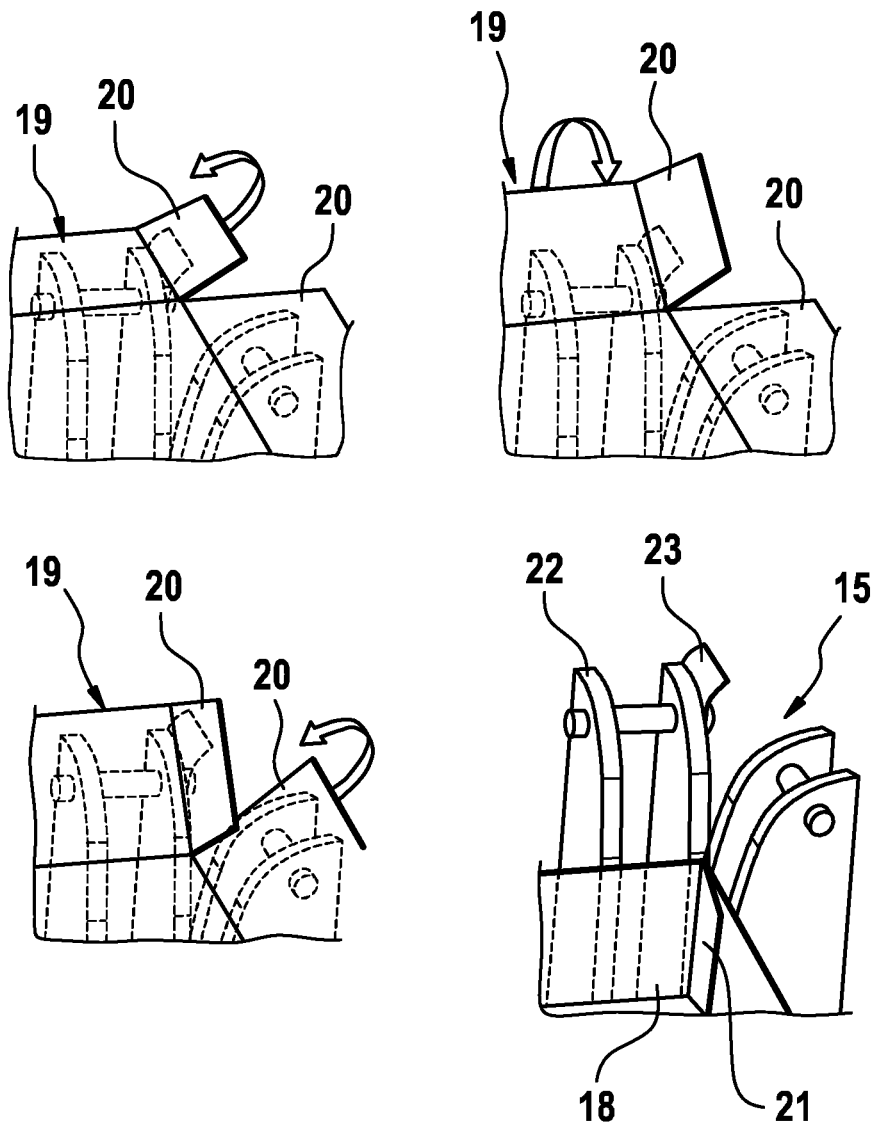
FIG. 8 shows a plurality of depictions of the folding process as said process is carried out by the packaging machine according to the invention pursuant to the exemplary embodiment.

In a plurality of depictions, FIG. 8 shows the folding process which is carried out by the folding tool 15. The die plate 12 of the forming unit 11 is masked out here for the sake of clarity. As shown in FIG. 8, a first lug 20 is initially folded at each joining site. A second lug 20 is subsequently folded so that both lugs 20 overlap and a joining site 21 is thus created. This folding or bending of the lugs 20 takes place by means of forming shoulders 22 and metal plates 23 on the folding tool 15.

Figure 9:
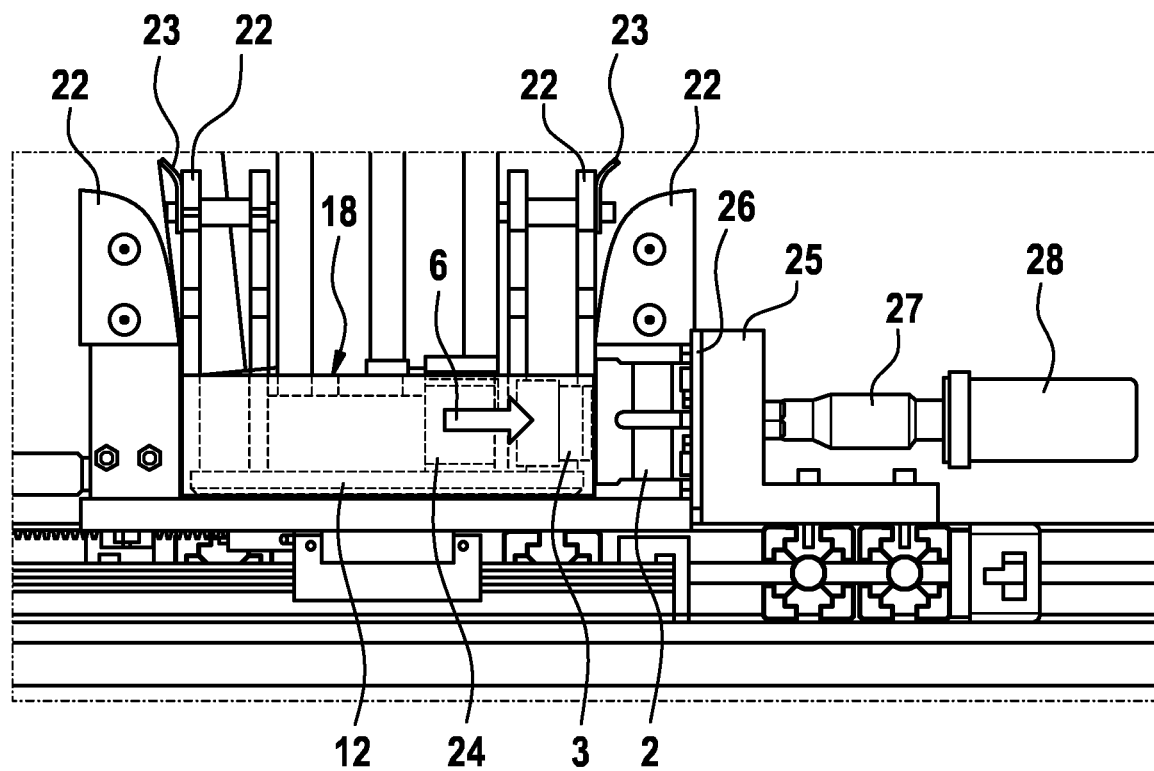
FIG. 9 shows a detailed view with regard to FIG. 5.
Figure 10:
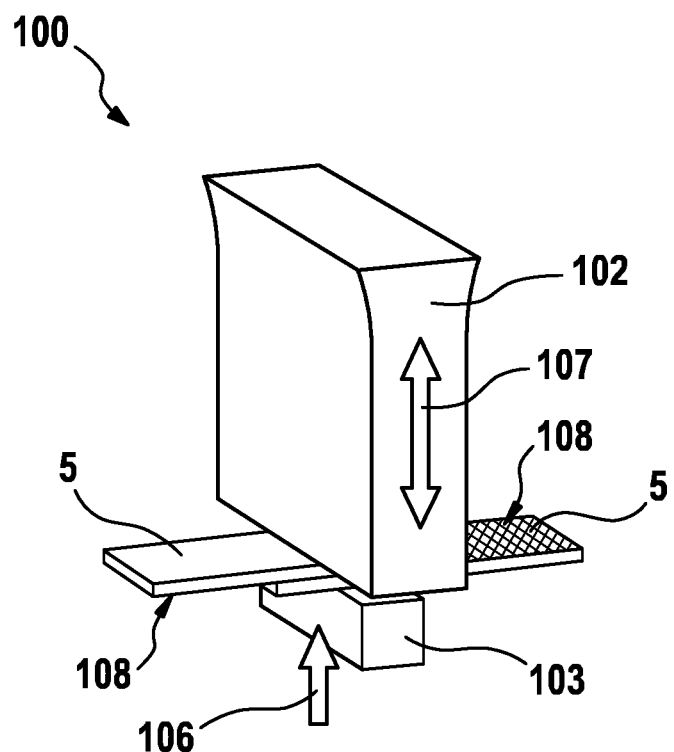
FIG. 10 shows an ultrasonic joining device according to the prior art.

FIG. 9 shows a detailed view with regard to FIG. 5. It can be seen in FIG. 9 that at least one anvil 3 is disposed on the die plate 12. This anvil 3 is move by means of a short-stroke cylinder 24. This short-stroke cylinder 24 is likewise disposed on the die plate 12. This short-stroke cylinder 24 is depicted only as a cylinder rod 8 in the schematically simplified depiction pursuant to FIG. 2.

The sonotrode 2 is located outside of the packaging 18. Provision is furthermore made for a hold-down device 26. This hold-down device 26 is pressed against the sonotrode 2 by means of a sonotrode holder 25. This movement of the sonotrode holder 25 is brought about by a booster 27 and a converter 28. Sonotrode 2 and anvil 3 can be moved toward one another by means of the short-stroke cylinder 24 and the sonotrode holder 25. The joining site 21 of the packaging 18 is located between sonotrode 2 and anvil 3. The movements of the short-stroke cylinder 24 and the sonotrode holder 25 therefore generate the joining force in the joining force direction 6. In this depicted example, the joining force direction 6 is oriented horizontally. In order to join the joining site 21, the sonotrode 2 is set into vibration in the plotted direction of vibration 7, i.e. perpendicular to the joining force direction 6.

Provision is also alternatively made for the direction of vibration 7 and the joining force direction 6 to be oriented parallel to one another in the case of an ultrasonic longitudinal welding process.

FIG. 9 further shows that the folding tool 15 and the sonotrode 2 comprising the sonotrode holder 25 are integrated into one tool.

What is claimed is:

1. A method for producing packaging (18) from paper material (5), said method comprising the following steps:
    forming packaging (18) from a single blank (19) made of paper material (5), wherein the single blank includes a first lug (20) and a second lug (20) spaced from the first lug (20);
    bringing the first lug (20) and the second lug (20) into an overlapping relationship with respect to one another, thereby forming at least one joining site (21);
    positioning the at least one joining site (21) between a sonotrode (2) and an anvil (3);
    applying a joining force to the at least one joining site (21) in a joining force direction (6);
    making the sonotrode (2) ultrasonically vibrate, thereby ultrasonically welding the first lug (20) and the second lug (20) of the paper material (5) together at the at least one joining site (21); and
    moistening the paper material (5) at one or more of the following times: before forming the packaging (18); while forming the packaging (18); after forming the packaging (18); and during the ultrasonic welding,
    wherein the ultrasonic welding includes ultrasonic friction welding during which the joining force direction (6) is not parallel to a direction of vibration of the ultrasonic vibration,
    characterized in that the joining force direction (6) is perpendicular to the direction of vibration (7), with a maximum deviation of ±10°.

2. The method according to claim 1, characterized in that the ultrasonic vibration frequency of the sonotrode (2) lies between 20 and 40 kHz.

3. The method according to claim 1, characterized in that an adhesive and a thermoplastic are not used for the ultrasonic welding process.

4. The method according to claim 1, characterized in that a common anvil (3) and/or a common sonotrode (2) are/is used for a plurality of joining sites (21) that are spaced apart from one another.

5. The method according to claim 1 wherein the paper material (5) is moistened on inner sides of the joining site.

6. The method according to claim 1, characterized in that the ultrasonic vibration frequency of the sonotrode (2) lies between 30 and 35 kHz.

7. The method according to claim 1, characterized in that an adhesive, a thermoplastic and a printing dye are not used for the ultrasonic welding process.

8. The method according to claim 1, wherein the step of applying the joining force includes moving the anvil against the sonotrode.

9. The method according to claim 8, wherein the anvil is moved via a cylinder rod.

10. A method for producing packaging (18) from paper material (5), said method comprising the following steps:
    forming packaging (18) from a single blank (19) made of paper material (5), wherein the single blank includes a first lug (20) and a second lug (20) spaced from the first lug (20), wherein the first lug (20) and the second lug (20) are folded or bended by a folding tool (15) from the single blank (19), and wherein a common sonotrode (2) and a common anvil (3) are integrated in the folding tool;
    bringing the first lug (20) and the second lug (20) into an overlapping relationship with respect to one another, thereby forming at least one joining site (21);
    positioning the at least one joining site (21) between the common sonotrode (2) and the common anvil (3);
    applying a joining force to the at least one joining site (21) in a joining force direction (6);
    making the sonotrode (2) ultrasonically vibrate, thereby ultrasonically welding the first lug (20) and the second lug (20) of the paper material (5) together at the at least one joining site (21); and
    moistening the paper material (5) at one or more of the following times: before forming the packaging (18); while forming the packaging (18); after forming the packaging (18); and during the ultrasonic welding,
    wherein the paper material (5) is moistened on inner sides of the joining site;
    wherein the ultrasonic welding includes ultrasonic friction welding during which the joining force direction (6) is not parallel to a direction of vibration (7) of the ultrasonic vibration,
    wherein the common anvil (3) and the common sonotrode (2) are used for a plurality of joining sites (21) that are spaced apart from one another, characterized in that the joining force direction (6) is perpendicular to the direction of vibration (7), with a maximum deviation of ±10°.

11. A method for producing packaging (18) from paper material (5), said method comprising the following steps:
    forming packaging (18) from a single blank (19) made of paper material (5), wherein the single blank includes a first lug (20) and a second lug (20) spaced from the first lug (20);
    bringing the first lug (20) and the second lug (20) into an overlapping relationship with respect to one another, thereby forming at least one joining site (21);
    positioning the at least one joining site (21) between a sonotrode (2) and an anvil (3);
    applying a joining force to the at least one joining site (21) in a joining force direction (6);

making the sonotrode (2) ultrasonically vibrate, thereby ultrasonically welding the first lug (20) and the second lug (20) of the paper material (5) together at the at least one joining site (21); and moistening the paper material (5) at one or more of the following times: before forming the packaging (18); while forming the packaging (18); after forming the packaging (18); and during the ultrasonic welding, wherein the ultrasonic welding includes ultrasonic friction welding during which the joining force direction (6) is not parallel to a direction of vibration (7) of the ultrasonic vibration, wherein the ultrasonic vibration frequency of the sonotrode (2) lies between 30 and 35 kHz, wherein an amplitude of the ultrasonic vibration of the sonotrode (2) lies between 20 µm and 40 µm, characterized in that the joining force direction (6) is perpendicular to the direction of vibration (7), with a maximum deviation of ±10°.

* * * * *